REMOTE-CONTROL AND SUPERVISION SYSTEM

Filed Feb. 13, 1952 2 Sheets-Sheet 1

Inventor
V. J. TERRY - R. H. DUNN
P. G. COLLIER
By Robert Harding Jr.
Attorney

REMOTE-CONTROL AND SUPERVISION SYSTEM

Filed Feb. 13, 1952 2 Sheets-Sheet 2

Inventor
V. J. TERRY-
R. H. DUNN-
P. G. COLLIER
By Robert Harding Jr.
Attorney

United States Patent Office 2,694,802
Patented Nov. 16, 1954

2,694,802

REMOTE-CONTROL AND SUPERVISION SYSTEM

Victor John Terry, Roland Harris Dunn, and Perceval Gerard Collier, London, England, assignors to International Standard Electric Corporation, New York, N. Y.

Application February 13, 1952, Serial No. 271,371

Claims priority, application Great Britain February 26, 1951

5 Claims. (Cl. 340—163)

This invention relates to call priority equipment in party line remote control and supervisory systems.

Hitherto, call priority equipment for party line remote control and supervisory systems has made use of a system of calling impulses of different durations permanently allotted to the various stations using the party line, the station allotted the longest calling impulse securing priority where several stations commence to call simultaneously. The practical difficulty of time discrimination set a limit to the number of stations which can be catered for by systems of this kind and prevent the use of certain forms of signalling in such systems and a principal object of the present invention is to provide a call priority arrangement which is not bound by these limitations.

According to the invention there is provided in a party line remote control or supervisory system, call priority equipment comprising a number of stations and comprising means for securing that when any two or more stations call simultaneously the station nearest to a predetermined end of the systems obtains priority over the other calling stations.

According to the invention there is further provided in a party line remote control or supervisory system, call priority equipment comprising a communication circuit having a first transmission path and a second transmission path, a first end station connected to both the said transmission paths at one end of the said circuit, a second end station connected to both transmission paths at the other end of the said circuit, at least one intermediate station connected, or each connected if more than one, to both transmission paths at an intermediate point or points in the said circuit, at the intermediate station, or at each of them if more than one, a sender, a receiver, a connection between the receiver and each of the transmission paths, a connection between the sender and the first transmission path at a point nearer the first end station than the point of connection between the receiver and the first transmission path, a connection from the sender to the second transmission path at a point nearer to the second end station than the point of connection of the receiver to the second transmission path, means for interrupting each of the transmission paths at a point between the points of connection thereto of the sender and receiver, means for interrupting the connection between the receiver and the first transmission path, means under control of the sender to operate the said three interrupting means, at each end station a sender and a receiver, at the first end station a connection from the receiver to the first transmission path and means under control of the sender for interrupting that connection and a connection from the sender to the second transmission path, at the second end station a connection from the sender to the first transmission path and from the receiver to the second transmission path and at each station, be it an end station or an intermediate station, means in the sender for sending a calling signal to the transmission path or paths to which such sender is connected, a connection between the receiver and the sender and means in the receiver responsive to a calling signal received over one of the transmission paths for disabling the sender, whereby stations whose senders are idle when another station is sending a calling signal, receive such calling signal to disable their senders and whereby when the senders at two or more stations simultaneously send a calling signal, the station of such two or more stations which is nearest, along the length of the said communication circuits to the first end station, or the first end station itself if it is one of such two or more stations, is unable to receive a calling signal from either transmission path and all other stations receive a calling signal over the second transmission paths to disable their senders.

The invention will be more readily understood from the following description of an embodiment thereof illustrated in the accompanying drawings in which.

The embodiment has been designed to meet a requirement for call priority equipment in remote supervision and/or control of a plurality of substations from one or more main stations on a four wire party line.

Figure 1:
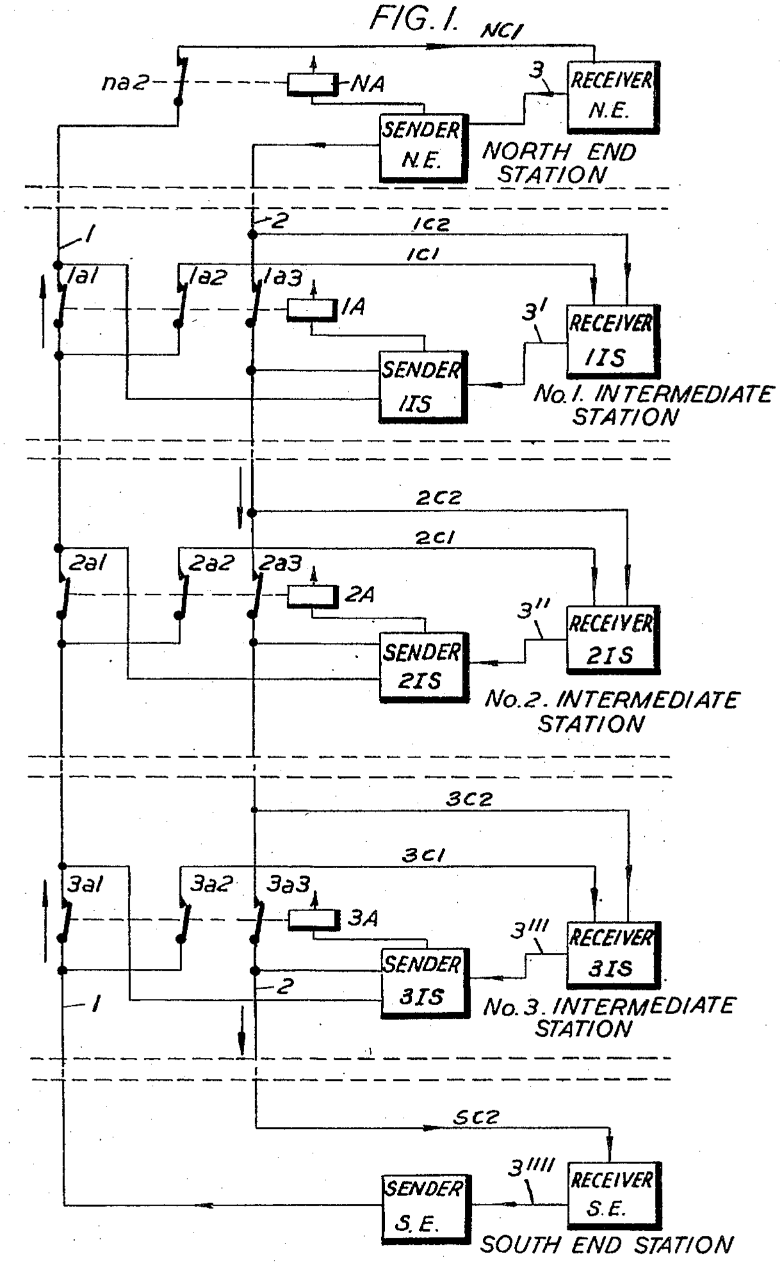
Fig. 1 is a block schematic of the embodiment.

Fig. 1 shows the basic layout of call-priority equipment on a party line with two end stations and a number of intermediate stations of which three are shown. It is necessary to ensure that only one station at a time obtains use of the party line, and Figure 1 shows a method of achieving this.

A four-wire party line having one conductive line pair 1, shown by a single line and another conductive line pair 2, also shown by a single line, runs the whole length between the two end stations, one shown as being at the north of the line, the other at the south.

The intermediate stations are tapped on to the party line at intermediate positions.

The end stations and intermediate stations each have a transmitter and a receiver and, except in the case of the end stations each receiver and each transmitter has a connection to each of the two-wire lines of the party line.

One two-wire line 1 is intended for north-going transmission, and the other line 2 for south-going transmission.

Each two-wire line can be interrupted at each intermediate station between the points of connection from the receiver and the sender of that station. The connection from line 1 to the receiver at each station is also capable of being interrupted, all these interruptions being under control of the sender at the station. The operation of the system can be readily understood from the following example:

Assume that the No. 2 intermediate station wishes to send. Upon start of the sender 2IS, relay 2A operates. Operation of relay 2A causes break contacts 2*a*1, 2*a*2 and 2*a*3 to open line 1, the connection 2C1 to receiver to 2IS, and line 2 respectively. Since contact 2*a*1 is open, sender 2IS can send only northward along line 1 and only southwards along line 2, contact 2*a*3 being also open and open circuiting line 2 northwards of the intermediate station No. 2. The receiver at each station is arranged to disable the sender thereat when signals are being received so that stations north of the No. 2 intermediate station receive signals therefrom over line 1, the connection therefrom to the receiver being made via their closed *a*2 relay contacts. Stations to the south of No. 2 intermediate station receive signals therefrom over line 2 via the connection therefrom to their receivers. Intermediate station No. 2 thus locks out all other stations, in both directions, from sending whilst it is sending by means of the disabling connections 3 which extends from each receiver to its associated sender in these other stations.

If two stations commence to send at the same time, they both operate their A relay and the more northerly of the two stations cuts off its receiver from line 1 at its open *a*2 contacts and cannot receive signals from the station to the south. The more southerly station however receives the signals of the more northerly sending station along line 2 and the sender at the more southerly station is disabled, giving priority to the more northerly station.

The same applies where more than two stations start to send simultaneously, the northern-most station securing the line.

For this purpose the end stations are on the same footing as the intermediate stations.

The end stations have substantially the same line access as intermediate stations but as they are at the ends of the line, some of the apparatus shown in the intermediate stations can be omitted. There is no need for the *a*1 and *a*3 contacts for instance at the end stations as the line only goes in one direction from each of the end stations.

The south end station receiver has no need for the connection to line 1 as there is no possibility of north-going signals coming to it and once it has commenced to send and has seized the party line, it has blocked all stations north of it owing to receipt of its signals by the receivers at those stations which receivers, in turn, block the associated senders at those stations.

The A relay can thus be omitted altogether at the south end station.

At the north end station a relay NA is provided having a pair of *a*2 contacts which are retained to preserve the priority of this station as the most northerly, in case this station starts to send simultaneously with another station.

In the embodiment described, the end stations are associated with the two main stations of the remote control and supervisory system whose role in the system is to receive supervisory indications from and send control signals to substations of the system with which the intermediate stations are associated. If supervisory functions only are required, the end stations could have the senders omitted and the connection to the receiver at the north end station would then be direct and not through the *na*2 contacts associated with relay NA, which relay is controlled by the sender at this station similarly to the control of the A relays at the intermediate station.

The main station or stations could equally well be associated with one or more of the intermediate stations as the difference between end stations and intermediate stations arises from their positions along the party line and not from the functions of their associated stations in the remote control and supervisory system.

Intermediate stations without senders could also be connected to the party line and they would not need to have any *a* contacts breaking the party lines or the receiver connection. The receivers at such listening stations would need connections to both party lines however to enable them to receive signals from stations on both sides.

The detailed circuits will now be described in relation to Fig. 2 which shows the two end stations and two intermediate stations.

All the intermediate stations are similarly equipped; No. 1 intermediate station for instance has a sender 4 and a receiver 5.

In each sender there is a contact K which represents the sending mechanism and may be a hand-operated key or other switch device according to the requirements of the remote control or supervisory system in which the invention is incorporated. Operation of contact 2K in the sender 8 of the No. 2 intermediate station connects a battery 2S6 across the twin conductors of both party lines over back contacts 2*d*1, 2*d*2 of a relay 2D in receiver 7. Operation of contact 2K also operates relay 2A in sender 8 which, at contacts 2*a*1, 2*a*2, breaks the conductors of line 1 representing the No. 1 party line; at contacts 2*a*3, 2*a*4, similarly breaks the conductors of line 2 representing the No. 2 party line, and at contacts 2*a*5, 2*a*6 breaks the connections from the conductors of line 1 of the No. 1 party line to receiver 7.

Relay 2A is slow to release so that it will remain operated during repeated openings and closings of the 2K contact in the course of signalling. Assuming that the No. 1 intermediate station has seized the line, the receivers of other stations will receive battery potential from the battery IS6 at the No. 1 intermediate station, over the connections from one or other of the party lines to the terminals of their receivers; the more northerly stations receiving the potential over line 1 and the more southerly stations receiving the potential over line 2.

To explain the effect of this application of potential from the battery 1S6 at the No. 1 intermediate station, the response at the No. 2 intermediate station will now be considered.

The receiver 7 at the No. 2 intermediate station like the receivers at all the other stations, has two relays, 2D and 2R. Both these relays operate to battery 1S6 via the circuit 1K, back contacts 1*d*1, 1*d*2, at the No. 1 intermediate station, the twin conductors of line 2 to relay 2D and 2R in parallel at the receiver 7 in the No. 2 intermediate station.

At the intermediate station No. 2, when relay 2D operates its contacts 2*d*1 and 2*d*2 open and break the connections from the sender 8 to the party lines 1 and 2 and open the operating circuit of relay 2A at contact 2*d*1.

Relay 2D is slow to release and holds up, in the event of intermittent pulsing of contact 1*k* at the No. 1 intermediate station, thereby to hold other stations locked out from sending. Relay 2*r* on the other hand, opens and closes with the repeated operations of contact 1K and its contacts 2*r* open and close the circuit from battery 9 to outgoing terminals T1, T2, which lead to signal responsive apparatus (not shown) the form of which is dictated by the control or supervisory requirements of the system in which the invention is incorporated and which forms no part of the invention.

The receivers at other stations operate in the same way as described with respect to the No. 2 intermediate stations, except that stations to the north of the sending station receive the signals over the party line 1 since the north-going circuit on the line 2 is broken by the opened *a*3, *a*4 contacts of the sending station. Similarly, the south-going circuit on the line 1 is broken at the opened *a*1, *a*2, contacts of the sending station.

The operations at the south end station, when receiving, differ from those at other stations in that there is no A relay to be disconnected.

Figure 2:
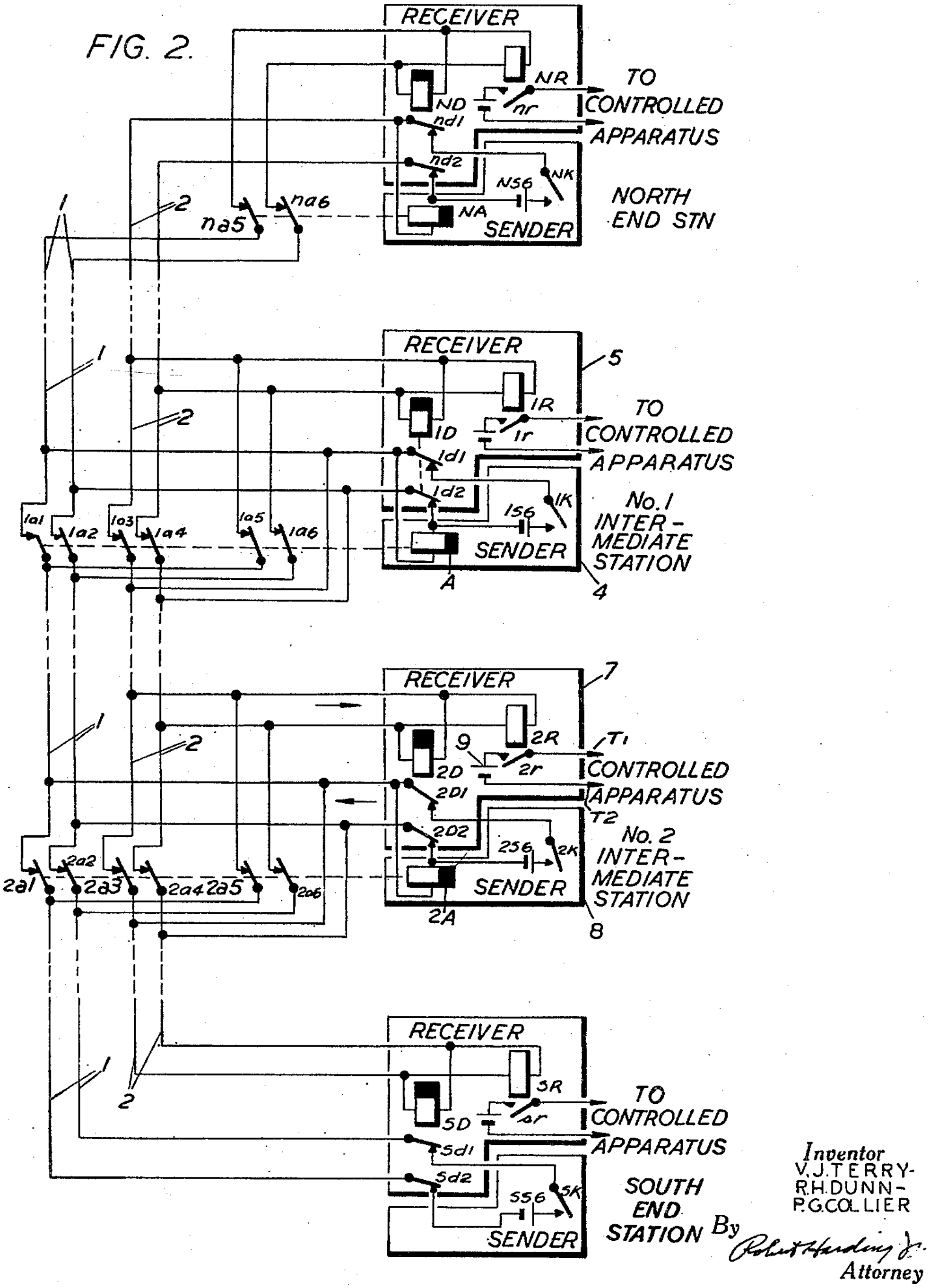
Fig. 2 is a more detailed circuit diagram of the embodiment.

Any station which is intended for listening only and therefore having no sender, has its receiver connected to the party line conductors in the same way as shown in Fig. 2 but without the insertion of any *a*5, *a*6 contacts in the connections where shown in Fig. 2. The A relay and its contacts are also omitted, and there is no need to provide any means for interrupting the party lines.

In the event of two stations attempting to call simultaneously, the most northerly of these stations operates its A relay and disconnects its receiver at its *a*5, *a*6 contacts, from line 1 and breaks the circuit of line 2 at its opened *a*3, *a*4 contacts so that it cannot receive from the south along line 2. More southerly stations also cut off their senders from northward communication along line 2 at their opened *a*3, *a*4, contacts which is a double safeguard against reception of their calls by the northernmost station along line 2.

Stations to the south attempting to call at the same time do not disconnect their receiver from line 2 nor does the northernmost sending station break this path, and so these more southerly stations operate their D relays and disconnect their senders and (except in the case of the south end station) their A relays. As line 2 is interrupted by all sending stations simultaneously, at their *a*3, *a*4 contacts where more than two stations are attempting to send simultaneously, there will be a race between operation of their D relays and a station removed by one or more stations from the most northerly of those simultaneously sending may have its D relay operated by the signals of the station immediately to the north of it, or, if that D relay of the latter station operates first, by the signals of some still more northerly station, over the *a*3, *a*4 contacts, now closed, of the immediately adjoining northerly station. Whichever happens, however, the ultimate result is the same.

While the principles of the invention have been described above in connection with specific embodiments and particular modifications thereof, it is to be clearly understood that this description is made only by way of example and not as a limitation on the scope of the invention.

What we claim is:

1. In a party line remote control or supervisory system, call priority apparatus comprising a first and a second communication path, a first and a second end station, a plurality of stations intermediate said end stations, each of said stations comprising receiving means and sending means associated therewith, the sending means associated with said first end station normally coupled to said first path, the sending means associated with said second end station normally coupled to said second path, the receiving means associated with said first end station normally coupled to said second path, the receiving means associated with said second end station normally coupled to said first path, the receiving means and sending means at each of said intermediate stations normally coupled to each of said paths in the directions of each of said end stations, separate disconnecting means at each of said intermediate stations for opening both said paths, for disconnecting the receiving means associated with said station from said first path in the direction of said first end station, and for disconnecting the sending means associated with said station from said second path in the direction of said second end station, each of said disconnecting means under control of the sending means associated with said station, additional disconnecting means associated with said second end station for disconnecting the receiving means thereat from said first path, said additional means under control of said sending means thereat, and separate disabling means at each station for disabling the sending means thereat, said disabling means under control of the receiving means thereat, whereby upon simultaneous sending from at least two of said stations, the station nearest said second end station obtains priority over said other sending station to the exclusion of said farthest station.

2. Call priority apparatus as claimed in claim 1, wherein said sending means comprises a contact and a source of potential, said intermediate stations having said contacts and sources adapted to be normally coupled in series-parallel relation with both said paths upon closure of the contact associated with said station, said first end station having its contact and source adapted to be normally coupled in series with said first path, said second end station having its contact and source adapted to be normally coupled in series with said second path.

3. Call priority apparatus as claimed in claim 2, wherein said receiving means comprises a relay responsive to the application of potential from the source associated with any other of said stations whose contact is closed.

4. Call priority apparatus as claimed in claim 2, wherein said disabling means comprises a disabling relay responsive to the application of potential from the source associated with any other of said stations whose contact is closed, said disconnecting relay having contacts serially connected between said key, said source and at least one of said paths, said disabling relay being of the delayed release type.

5. Call priority apparatus as claimed in claim 2, wherein said disconnecting means comprises a disconnecting relay having three pairs of back contacts, a first pair of said contacts serially connected between said first path, a second pair of said contacts serially connected between said second path, said third pair of contacts connected in parallel to both said paths, said disconnecting relay being of the delayed release type.

References Cited in the file of this patent

UNITED STATES PATENTS

| Number | Name | Date |
|---|---|---|
| 1,342,635 | Lewis | June 8, 1920 |
| 1,562,210 | Field | Nov. 17, 1925 |
| 1,613,944 | Field | Jan. 11, 1927 |
| 1,863,089 | Field | June 14, 1932 |
| 1,950,108 | Harrington | Mar. 6, 1934 |
| 2,045,713 | Judge | June 30, 1936 |
| 2,047,631 | Hershey et al. | July 14, 1936 |
| 2,126,209 | Preston | Aug. 9, 1938 |
| 2,174,291 | Powell | Sept. 26, 1939 |
| 2,183,245 | Muehter | Dec. 12, 1939 |
| 2,390,222 | Muehter | Dec. 4, 1945 |